United States Patent [19]

Strong

[11] 4,029,081
[45] June 14, 1977

[54] SOLAR ENERGY TRANSPORT SYSTEM

[76] Inventor: John D. Strong, 136 Gray St., Amherst, Mass. 01002

[22] Filed: Nov. 14, 1975

[21] Appl. No.: 631,877

[52] U.S. Cl. .............................. 126/270; 126/271; 237/1 A; 126/400

[51] Int. Cl.² .......................................... F24J 3/02

[58] Field of Search .................. 126/270, 271, 400; 237/1 A; 62/2; 60/641; 165/18; 52/82; 261/119 R, 111, 148, 149

[56] References Cited

UNITED STATES PATENTS

| 2,677,367 | 5/1954 | Telkes | 126/270 |
| 2,680,565 | 6/1954 | Lof | 237/1 A |
| 3,894,528 | 7/1975 | Stubblefield | 126/271 |
| 3,910,253 | 10/1975 | Thomason et al. | 126/271 |
| 3,949,732 | 4/1976 | Reines | 126/271 |

Primary Examiner—Kenneth W. Sprague
Assistant Examiner—James C. Yeung
Attorney, Agent, or Firm—Kenway & Jenney

[57] ABSTRACT

A solar energy collector comprises a heat conducting sheet having a front surface exposed to the sun and a system of liquid-receiving open-top troughs projecting from the back surface into an air space, with liquid supply means delivering liquid to the troughs and drain means receiving any liquid overflowing the troughs. Inlet and outlet air conduits communicate with the air space, and a blower causes a flow of air from the inlet conduit, through the air space, and to the outlet conduit; whereby the heat of vaporization of any liquid vaporized is transferred from the sheet to the outlet air conduit in addition to the heat transferred by the sensible temperature rise of the air and the vapor. Also disclosed are a heat storage unit, for use with such an energy collector, in which the heat storage medium may be stones, water, or it may be formed from Glauber's Salt, and a complete solar energy utilization system comprising such a collector, such a heat storage unit, and a heat exchanger (e.g., a radiator or convector in a living space) with controls and valves for (1) delivering heat from the sheet to the storage unit, (2) delivering heat from the sheet to the heat exchanger, or (3) delivering heat from the storage unit to the heat exchanger.

12 Claims, 7 Drawing Figures

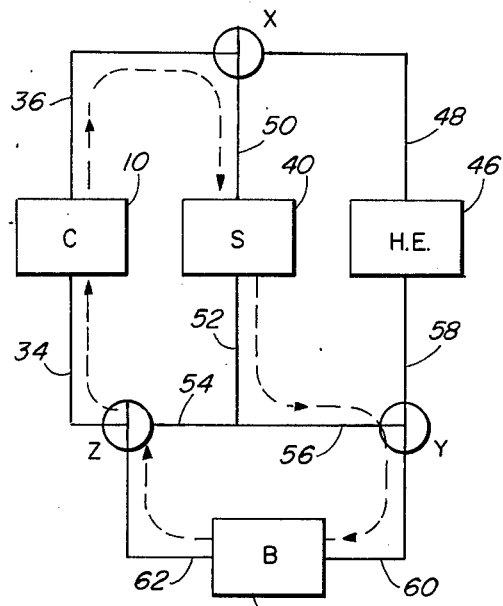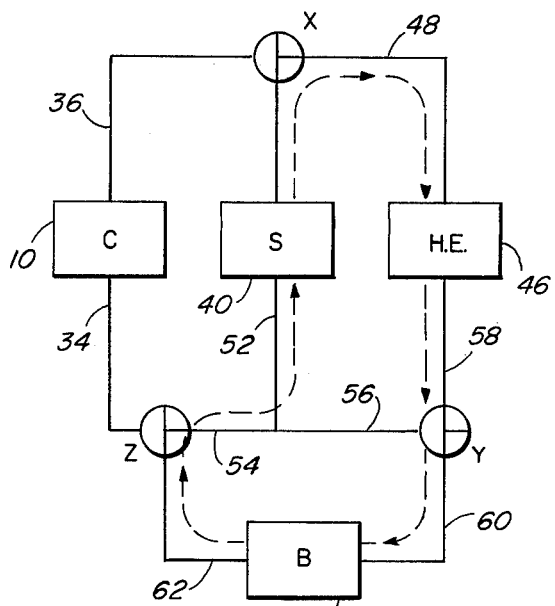
FIG. 3A   FIG. 3B
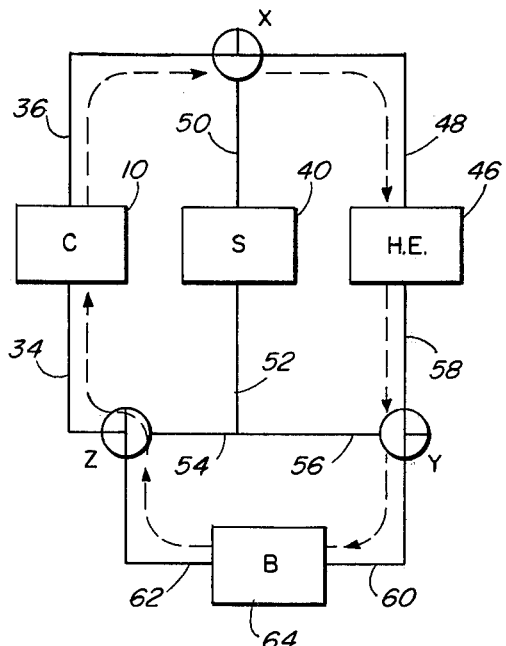
FIG. 3C

SOLAR ENERGY TRANSPORT SYSTEM

BACKGROUND OF THE INVENTION

This invention relates to a solar energy collector and to a solar energy utilization system employing such a collector.

It is a principal object of the present invention to provide a solar energy collector that employs inexpensive, and readily available, heat transfer media (e.g., air and water), while providing an increased efficiency of heat transfer over that previously attainable with simple air transport means.

It is also an object of the present invention to provide an improved solar energy utilization system employing such a collector, an improved heat storage unit, and a heat exchanger, in which the flow of heat through the system is controlled to optimize heat utilization.

SUMMARY OF THE INVENTION

The foregoing, and other objects and advantages, are achieved by the use of a solar energy collector that comprises a heat conducting sheet having a surface for exposure to the sun and an enclosed air space abutting the sheet. Both a liquid flow system and an air flow system communicate with the air space opposite the sun. The liquid flow system includes liquid supply means, a system of liquid-receiving, open-top troughs in the air space in thermal contact with the conducting sheet and drain means for receiving any liquid overflowing the troughs. The air flow system comprises inlet and outlet air conduits communicating with the air space and means for causing a flow of air through the inlet conduit, air space, and outlet conduit. The described arrangement facilitates the vaporization of the liquid, whereby the latent heat of vaporization of the quantity of the liquid that is vaporized is transferred from the sheet to the outlet air conduit, in addition to the heat transferred by the temperature rises of both the air and the vapor. In preferred embodiments of the invention, the liquid is water and the collector is used in combination with the heat storage unit connected thereto via the outlet air conduit, the heat storage unit having Glauber's Salt as a heat storage medium.

In another aspect, the invention features a solar heating system comprising a solar energy collector in which solar energy is employed both to vaporize water in an air space and to heat the resulting air and water vapor mixture; a heat storage unit; a heat exchanger in the space to be heated; a conduit system interconnecting the solar energy collector, the heat storage unit, and the heat exchanger, a blower for causing air flow in the conduit system; and valve means in the conduit system for selectively interconnecting one of the following groups of elements: (a) the collector, the storage unit, and the blower; (b) the collector, the exchanger, and the blower; and (c) the storage unit, the exchanger, and the blower. Preferably, the heat exchanger includes a selectively operable vent to the space to be heated, thereby enabling the release of warm humid air from within the heat exchanger to the space to be heated.

BRIEF DESCRIPTION OF THE DRAWINGS

Other objects, features, and advantages of the invention will appear from the following description of particular preferred embodiments, taken together with the accompanying drawings. In the drawings:

FIG. 1A is a fragmentary enlarged view of the collector of FIG. 1;

FIGS. 3A, 3B, and 3C are schematic illustrations showing various possible heat flow paths in the system of FIG. 2.

DETAILED DESCRIPTION OF PARTICULAR PREFERRED EMBODIMENTS

Figure 1:
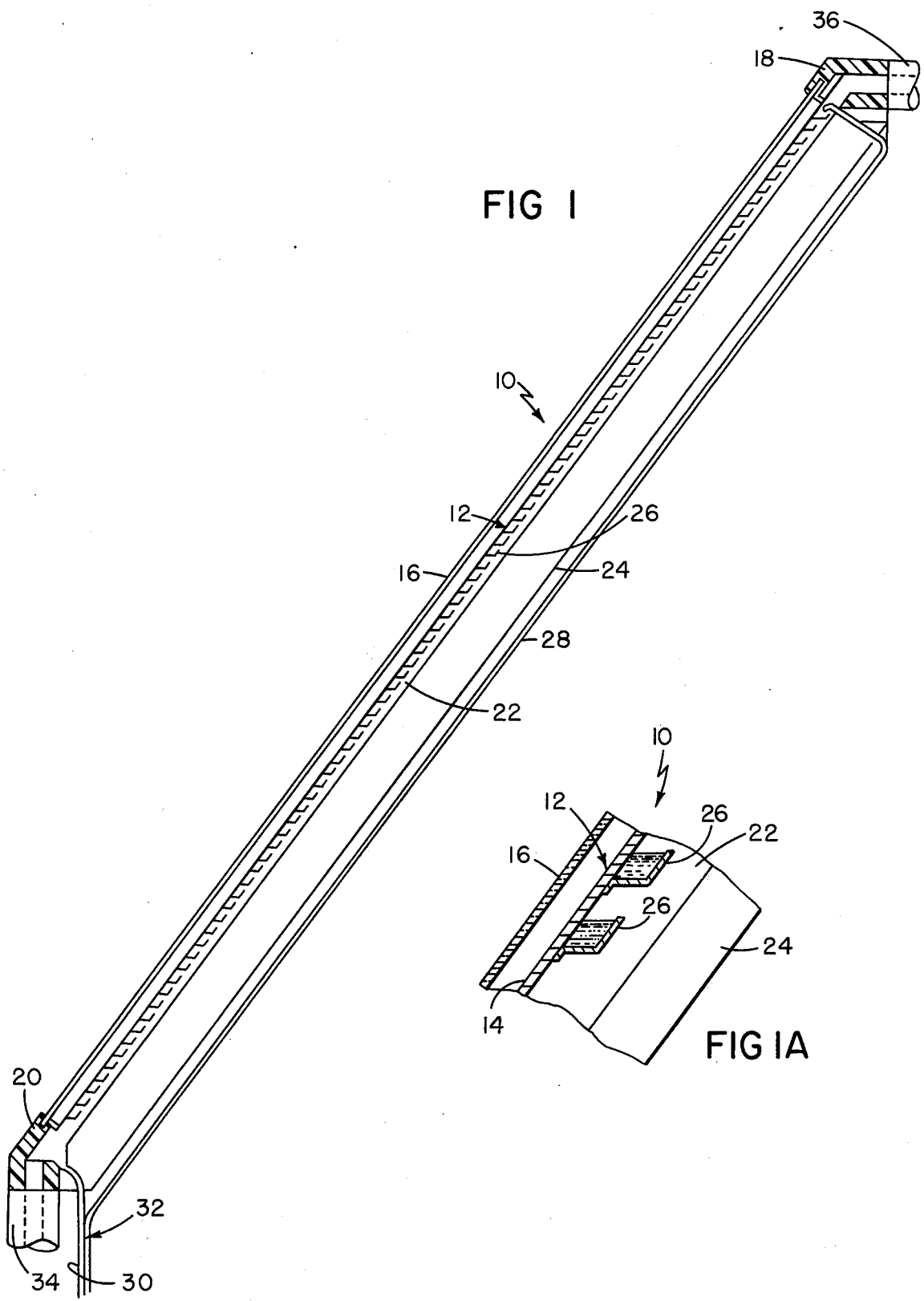
FIG. 1 is a view, in vertical section, of a solar energy collector constructed in accordance with the present invention as mounted on a sloping roof for exposure to solar radiation.

Referring to FIGS. 1 and 1A, the collector 10 comprises a thin sheet 12 of thermally conductive material (e.g., galvanized iron) painted black on the surface 14 to be exposed to the sun. A sheet of glass 16, supported in upper and lower headers, 18, 20 overlies the exposed surface of the sheet 12 to provide an air space that insulates the sheet against the loss of collected solar heat by conduction or re-radiation. The enclosed air space 22 is provided between the reverse surface of the sheet 12 and a layer of insulation 24.

A system of open-top liquid troughs 26 is provided on the reverse surface of the sheet 12 in good thermal contact therewith. While any liquid that is readily evaporated can be employed (e.g., alcohol, ether, etc.), water is preferred for reasons of cost, availability, compatability with existing heating systems, etc. Water is supplied to the troughs 26 within the air space 22 by an inlet line 28 that communicates with the upper header 18. Interconnections between adjacent troughs (not shown) assure delivery of water to each of the troughs of the system. A drain line 30 communicates with the lower header 20 to receive any water which may overflow the troughs. Preferably, the water lines 28 and 30 are in thermal contact, as at 32, in order to recover a portion of the heat in any water that overflows the troughs 26. An insulated air inlet conduit 34 communicates with the lower header 20 and a similar insulated conduit 36 communicates with the upper header 18. A blower (not shown in FIG. 1) produces circulation of air from conduit 34, through the air space 22, and out the conduit 36. The latter conduit conveys the heated air and water vapor either to a heat storage unit or to a heat exchanger, all as further described below.

Thus, the solar energy collector of FIG. 1 transfers heat from the collector sheet 12 to the outlet conduit 36 not only by the sensible heat of both air and water vapor, but also by the latent heat of the water that is evaporated from the trough system 26 for subsequent condensation at a heat storage unit or a heat exchanger. The combined burden of heat that is carried is thus several times greater than that which would be carried by sensible heat alone (i.e., circulation of an equal volume of dry air). The water condensed at the locus of heat extraction (i.e., the heat storage unit or the heat exchanger) is discharged as waste. Because of the large amount of heat transferred in the form of the latent heat of vaporization of water, the required flow of water to the trough system 26 can be quite small. For a typical mode of operation of the collector of FIG. 1 exposed to the sun (and the remainder of a utilization system as further described below) about 1.6 grams of water per minute (i.e., 1/37 gallons per hour) for a panel of one square foot area may be evaporated from the troughs. If any excess water above this amount is delivered via water line 28, it merely overflows the troughs as waste. Precise regulation of the water flow is thus not essential. Because of the thermal contact of inlet and outlet lines 28,30, however, a considerable fraction of the energy that has been absorbed by such waste water is recovered.

The increased heat burden carried by the circulating air and water vapor relative to an equal volume of dry air is evident from Table I below. The values of Table I are calculated predictions derivable from the gas law:

$$pV/c = nRT$$

For this relationship, when pressure, $p$, is expressed in millimeters of mercury; volume, $V$, in cm$^3$; and temperature, $T$, in degrees Kelvin; the constants are $C = 31392$ and $R = 1.9865$.

In the application of the gas law, the latent heat of vaporization of water is taken as 578.3 cal gm$^{-1}$ (at 35° C). The volume of circulation, taken as an example, is 28,350 cm$^3$ (1 cubic foot). It is considered saturated with water vapor at a partial pressure, $P_1$, at a heat source temperature, $T_1$°K. And, it is taken as emerging from the heat sink (i.e., a heat storage unit or head exchanger) saturated with water vapor at the lower temperature, $T_2$°K, with the partial pressure, $p_2$. $P_1$ and $P_2$ are, respectively, the partial pressure of air at $T_1$ and $T_2$. The two total pressures are equal $p_1 + P_1 = p_2 + P_2 = 760$. Since, $$V_2 = \frac{fT_2}{T_1} V_1, \text{ where } f = \frac{760 - p_1}{760 - p_2}$$

the various heat transports of the circulation are as follows:

$$\Delta E_{air} = 0.903(760 - p_1) \times 3.5 \ (\Delta T/T)$$

$$\Delta E_{wv} = 0.903 \left( p_1 - \frac{fT_2}{T_1} p_2 \right) \times 4 \frac{\Delta T}{T}$$

$$\Delta E_L = 8.19(578.3 - 15)(p_1 - fp_2).$$

The other heat transport of interest is:
$$\Delta E_{dry} = 2402 \ (\Delta T/T)$$

The gain factor, representing the performance achieved by my invention, is $$G = \frac{\Sigma(\Delta E_{air} + \Delta E_{wv} + \Delta E_L)}{\Delta E_{dry}}$$

In order to make the calculations given in Table I, values of the vapor pressure of water, P, as function of T were derived from:

$$\ln(p) = 18.2726 - \frac{3708.5}{T} - \frac{237100}{T^2}$$

Thus, it is evident that at readily achievable temperatures of the solar collector (i.e., $T_1$), the heat burden carried according to my invention is about an order of magnitude larger than that of an equal volume of dry air. The gain is substantially the same relative to moist air-if no condensation occurs. The ten-fold gain demonstrated by Table I implies that smaller conduits can be used in the present solar energy transport system than would be feasible with prior systems. Such smaller conduits of course, permit greater conduit heat insulation at lower costs.

TABLE I $T_1$ - HEAT SOURCE (i.e., SOLAR COLLECTOR) TEMPERATURE
$T_2$ - HEAT SINK TEMPERATURE -- TAKEN AS 273.2 + 35° = 308.2° K
$\Delta E_{wv}$ - SENSIBLE HEAT CARRIED BY WATER VAPOR IN ONE CUBIC FOOT (28,350 cm$^3$) OF CIRCULATION RECKONED AT TEMPERATURE, $T_1$
$\Delta E_{air}$ - SENSIBLE HEAT CARRIED BY AIR IN ONE CUBIC FOOT (28,350 cm$^3$) OF CIRCULATION RECKONED AT TEMPERATURE, $T_1$
$\Delta E_L$ - LATENT HEAT CARRIED IN ONE CUBIC FOOT (28,350 cm$^3$) OF CIRCULATION RECKONED AT TEMPERATURE, $T_1$
$\Delta E_{dry}$ - SENSIBLE HEAT CARRIED BY AN EQUIVALENT CIRCULATION OF DRY AIR
G - MERIT FACTOR: $\Sigma(\Delta E_{wv} + \Delta E_{air} + \Delta E_L)/\Delta E_{dry}$

| $T_1$° C | 40 | 50 | 55 | 60 | 70 | 80 | 90 |
|---|---|---|---|---|---|---|---|
| $T_1$° K | 313.2 | 323.2 | 328.2 | 333.2 | 343.2 | 353.2 | 363.2 |
| $\Delta E_{wv}$ (gm. cal.) | 53.46 | 199.91 | 300.05 | 420.37 | 742.78 | 1207.84 | 2217.94 |
| $\Delta E_{air}$ (gm. cal.) | 35.64 | 97.90 | 123.63 | 144.80 | 169.65 | 163.08 | 112.18 |
| $\Delta E_L$ (gm. cal.) | 208.49 | 764.10 | 1132.41 | 1574.13 | 2724.24 | 4327.90 | 6499.70 |
| $\Sigma$ (gm. cal.) | 297.59 | 1061.91 | 1556.09 | 2139.30 | 3636.67 | 5698.82 | 8829.82 |
| $\Delta E_{dry}$ (gm. cal.) | 38.34 | 111.49 | 146.40 | 180.24 | 245.00 | 306.10 | 363.80 |
| G | 7.76 | 9.52 | 10.63 | 11.87 | 14.84 | 18.62 | 24.27 |

Figure 2:
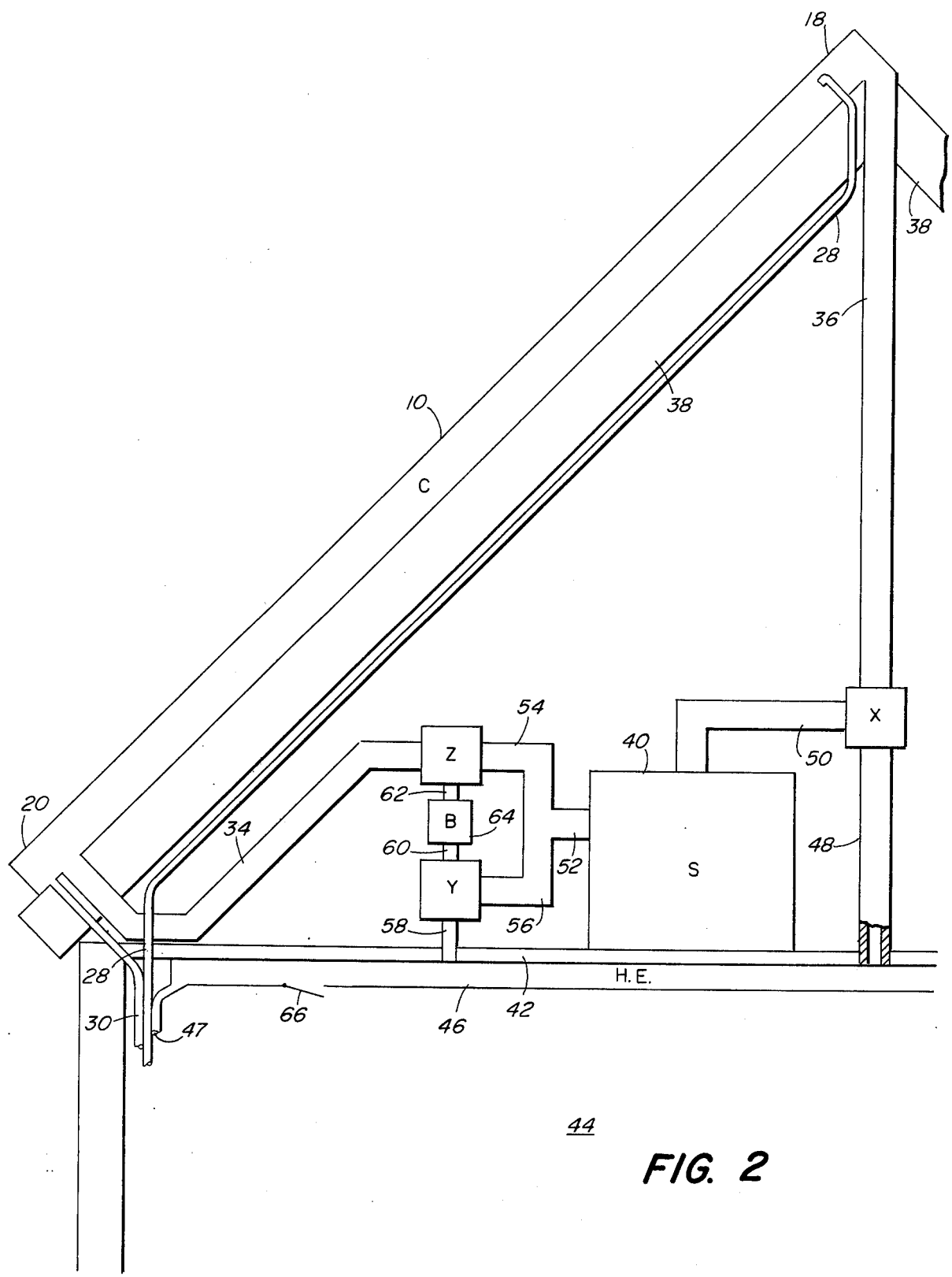
FIG. 2 is an illustration of a solar energy utilization system in accordance with the present invention.

FIG. 2 is a somewhat simplified illustration of one preferred embodiment of a solar energy utilization system employing a solar energy collector 10 such as shown in FIG. 1.

The collector 10 is mounted on the sloping roof 38 of a dwelling in orientation to receive a substantial amount of solar radiation (i.e., facing south for dwellings in the North temperate zone). A heat storage unit 40 is provided. It is shown for simplicity as located in the attic space of the dwelling supported above the ceiling 42 of the living space 44. Normally, because of the great weight of storage material, a basement is a preferred location. A heat exchanger 46 having a condensate drain 47 is provided in the living space 44 and a series of conduits 34, 36, 48, 50, 52, 54, 58, 60, 62 interconnect the collector 10, the storage unit 40, the heat exchanger 46, and a blower 64. A series of valves X, Y, and Z are provided in the conduit system for effecting various alternative air flow paths through the conduits between the various elements of the solar energy utilization system. (These alternatives are discussed in detail below in connection with FIGS. 3A–C.) One or more vents 66 are provided in the exchanger 46 for selectively establishing communication between the interior of the heat exchanger and the living space 44. When a vent 66 is open, therefore, humid air from within the heat exchanger can escape to the living space, thereby effecting humidification of the living space, as may be desirable in various circumstances (e.g., in dwellings during the winter, in greenhouses at any time, etc.).

In FIGS. 3A–C, the valves X, Y, Z are illustrated schematically as three-way stopcocks. As is evident from these Figures, appropriate settings of the three valves can be employed to transfer heat from the collector 10 to the storage unit 40, from the collector 10 to the heat exchanger 46, or from the storage unit 40 to the heat exchanger 46. Thus, at times when heat is required in the living space 44 and the sun is shining, the system can be arranged as in FIG. 3C for the direct delivery of heat from the solar collector 10 to the heat exchanger 46. At times when the sun is shining but there is no requirement for heat in the living space 44, the system can be arranged as in FIG. 3A for the delivery of heat from the collector 10 to the storage unit 40. Finally, when the sun is not shining but there remains a requirement for heat in the living space 44, heat can be withdrawn from the storage unit 40 and delivered to the heat exchanger 46 by effecting the valving arrangement shown in FIG. 3B. In either of the arrangement of FIGS. 3B or 3C, of course, the vents 66 may be opened or closed, as desired.

As will be apparent to those skilled in the art, conventional temperature sensors and associated relays can be employed for automatically controlling the valves X, Y, and Z, as well as the blower 64. Additionally, the solar collector and the entire solar energy utilization system according to the present invention can be employed in various configurations for use with various structures. Thus, for example, in addition to a system that is integral with a dwelling, modules consisting of collectors and storage units in combination, can be played at a distance from a dwelling for better exposure to solar radiation with insulated conduits being provided between the storage unit and the heat exchanger located in the remote dwelling or other building.

In the preferred storage unit construction, a heat storage medium of Glauber's Salt (i.e., decahydrated sodium sulfate) invested in Portland Cement, or in Plaster of Paris, is employed. This storage material was assumed for the calculations of Table I, yielding $(35 - 32.38) = 2.62°$ C to drive heat into it. This material has a phase transition at 32.38° C (90.3° F) with an associated heat of transition of 60 cal/gm (108 BTU per lb) and, thus, can store large amounts of energy in the temperature range typically found in a solar heating system. The heat storage medium is surrounded by insulation that is penetrated only by the inlet and outlet conduits and a condensate drain. The amount of insulation required would depend upon whether the anticipated storage cycle was short term (e.g., day-to-day) or long term (e.g., season-to-season).

Alternative storage materials, with other phase transition temperatures, may be employed as may stones or water (in an insulated cistern).

As will also be appreciated by those skilled in the art, a further advantage of the present invention is that the vaporization of water causes heat to be extracted from the collector's sheet 12 at a faster rate than would be the case with dry air, thus resulting in a lower operating temperature of the collector. The lower operating temperature, in turn, leads to less heat loss from the collector back to the ambient atmosphere.

Figure 4:
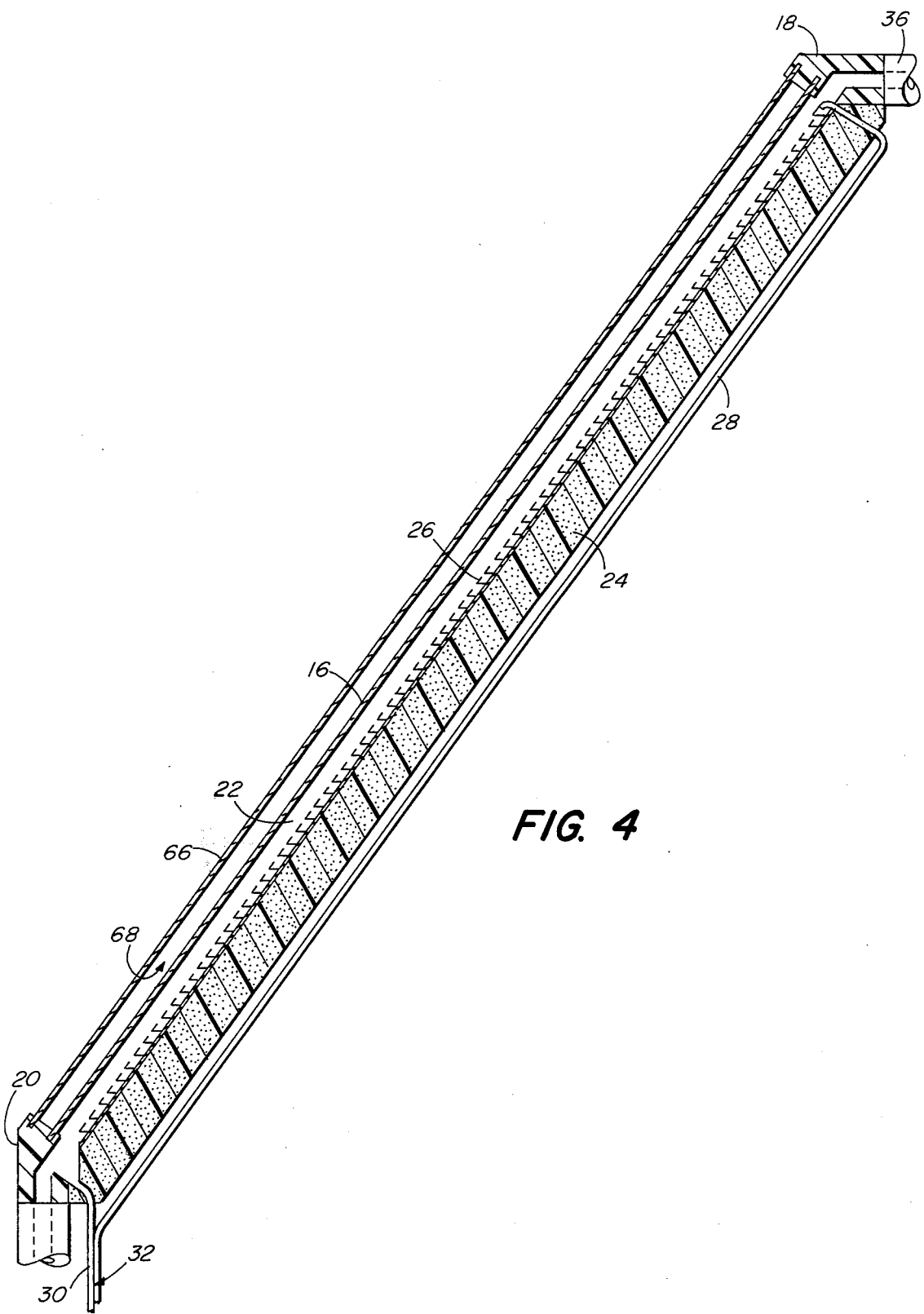
FIG. 4 is a view similar to FIG. 1 of an alternative collector embodiment.

FIG. 4 illustrates an alternative solar energy collector embodiment in which the troughs 26 are provided on the front surface of the sheet 12. With the embodiment of FIG. 4, the collector plate could be stamped from a single sheet of metal to have channels embossed on the appropriate surface, rather than having the channels formed separately and attached (e.g., soldered) to a flat plate 12. With the space 22, which receives moist air, facing the sun, a second sheet of glass 66 is provided to create an insulating dry air space 68 and to prevent condensation of moisture on the interior surface on the sheet of glass that is exposed to the ambient (i.e., sheet 66 in the embodiment of FIG. 4). As will be evident to those skilled in the art, the operation of the solar energy collector of FIG. 4 is substantially identical to that of the collector of FIG. 1.

While particular preferred embodiments of the various aspects of the present invention have been illustrated in the accompanying drawings and described in detail herein, other embodiments are within the scope of the invention and the following claims.

I claim:
1. A solar energy collector comprising
   a heat conducting sheet having surface for exposure to the sun,
   an enclosed air space abutting said sheet,
   a system of liquid-receiving, open-top troughs in said air space in thermal contact with said sheet,
   liquid supply means for delivering liquid to said troughs and drain means for receiving any liquid overflowing said troughs,
   inlet and outlet air conduits communicating with said air space, and
   means for causing a flow of air through said air space;
   whereby the heat of vaporization of the quantity of liquid vaporized is transferred from said sheet to said outlet air conduit in addition to the heat transferred by the temperature rises of the air and the vapor.
2. The solar energy collector of claim 1 wherein said liquid is water.
3. The solar energy collector of claim 1 in combination with a heat storage unit connected thereto by said outlet air conduit, said heat storage unit having Glauber's Sals as a heat storage medium.
4. The solar energy collector of claim 1 wherein said air space abuts the surface of said sheet opposite said surface for exposure to the sun.
5. The solar energy collector of claim 1 wherein said air space abuts the said surface for exposure to the sun.
6. The solar energy collector of claim 1 wherein said sheet is angled with respect to the horizontal thereby having an upper end and a lower end, said liquid supply means comprising a conduit terminating adjacent said upper end and said inlet air conduit communicating with said air space at said lower end.
7. A solar heating system comprising
   a solar energy collector in which solar energy is employed to vaporize water from a water surface exposed to air and to heat the resulting air and water vapor mixture,
   a heat storage unit,
   a heat exchanger in the space to be heated,
   a conduit system interconnecting said solar energy collector, said heat storage unit, and said heat exchanger,
   a blower for causing air flow in said conduit system, and
   valve means in said conduit system for selectively interconnecting (a) said solar energy collector, said heat storage unit, and said blower, (b) said solar energy collector, said heat exchanger, and said blower, and (c) said heat storage unit, said heat exchanger, and said blower.

8. The solar heating system of claim 7 wherein said heat exchanger includes a selectively operable vent to the space to be heated, thereby enabling the release of water vapor laden air to said space to be heated.

9. The solar heating system of claim 8 wherein said heat storage unit employs Glauber's Salt as a heat storage medium.

10. A solar heating system comprising
A. a solar energy collector comprising
a heat conducting sheet having surface for exposure to the sun,
an enclosed air space abutting said sheet,
a system of liquid-receiving, open-top troughs in said air space in thermal contact with said sheet,
liquid supply means for delivering liquid to said troughs and drain means for receiving any liquid overflowing said troughs,
inlet and outlet air conduits communicating with said air space, and
means for causing a flow of air through said air space;
whereby the heat of vaporization of the quantity of liquid vaporized is transferred from said sheet to said outlet air conduit in addition to the heat transferred by the temperature rises of the air and the vapor;
B. heat transport system communicating with said inlet and outlet air conduits and operative to produce a circulation of air and of water vapor evaporated in said air space; and
C. a condenser connected to said collector via said heat transport system and including condensing surface for removal of heat from said circulation.

11. The solar heating system of claim 10 wherein said condensor is provided in a heat exchanger.

12. The solar heating system of claim 10 wherein said condenser is provided in a heat storage unit.

* * * * *